(12) United States Patent
Chen

(10) Patent No.: US 11,775,586 B2
(45) Date of Patent: Oct. 3, 2023

(54) SYSTEM AND METHOD FOR IMPLEMENTING CLOUD OPERATION WITH NO PRIOR KNOWLEDGE OF SERVICES

(71) Applicant: JPMorgan Chase Bank, N.A., New York, NY (US)

(72) Inventor: Fei Chen, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 119 days.

(21) Appl. No.: 17/192,474

(22) Filed: Mar. 4, 2021

(65) Prior Publication Data

US 2021/0282151 A1    Sep. 9, 2021

Related U.S. Application Data

(60) Provisional application No. 62/984,846, filed on Mar. 4, 2020.

(51) Int. Cl.
*G06F 7/00*      (2006.01)
*G06F 16/903*    (2019.01)
*G06F 16/9035*   (2019.01)
*G06F 9/50*      (2006.01)
*G06F 9/48*      (2006.01)
*H04L 67/10*     (2022.01)

(52) U.S. Cl.
CPC ........ *G06F 16/90335* (2019.01); *G06F 9/485* (2013.01); *G06F 9/5072* (2013.01); *G06F 16/9035* (2019.01); *H04L 67/10* (2013.01)

(58) Field of Classification Search
CPC .. G06F 16/90335; G06F 9/485; G06F 9/5072; G06F 16/9035; H04L 67/10
See application file for complete search history.

(56) References Cited

U.S. PATENT DOCUMENTS

| | | | |
|---|---|---|---|
| 2005/0246726 A1* | 11/2005 | Labrou | G06F 9/465 719/328 |
| 2012/0072579 A1* | 3/2012 | Teather | H04L 41/5009 709/224 |
| 2014/0372533 A1* | 12/2014 | Fu | H04L 67/10 709/204 |
| 2015/0074175 A1* | 3/2015 | Musial | H04L 67/10 709/203 |
| 2015/0341230 A1* | 11/2015 | Dave | H04L 41/0893 705/7.29 |
| 2016/0019636 A1* | 1/2016 | Adapalli | H04L 47/70 705/26.81 |
| 2016/0021197 A1* | 1/2016 | Pogrebinsky | G06F 9/5072 709/226 |
| 2016/0364265 A1* | 12/2016 | Cao | G06F 9/50 |
| 2018/0084081 A1* | 3/2018 | Kuchibhotla | H04L 41/0816 |
| 2018/0205618 A1* | 7/2018 | Weiner | H04L 41/5012 |
| 2019/0220285 A1* | 7/2019 | Ali | G06F 9/4401 |
| 2019/0288956 A1* | 9/2019 | Pulier | H04L 47/70 |

(Continued)

*Primary Examiner* — Mohammed R Uddin
(74) *Attorney, Agent, or Firm* — GREENBLUM AND BERNSTEIN, P.L.C.

(57) ABSTRACT

An embodiment of the present invention is directed to cloud automation that is environment agnostic and requires no prior knowledge of services and no service configuration. The innovative system provides a zero knowledge cloud service operation automation, with the limited exception of defining smart query logic.

16 Claims, 10 Drawing Sheets

(56) References Cited

U.S. PATENT DOCUMENTS

| 2020/0169478 A1* | 5/2020 | Joshi | G06Q 50/10 |
| 2022/0255743 A1* | 8/2022 | Vágujhelyi | H04L 9/50 |
| 2022/0263914 A1* | 8/2022 | Thatikonda | G06N 20/00 |

* cited by examiner

```
210
for env in dev
do
    for pool in 1b 3b 1a 3a 4b
    do
        /share/DeploymentTools/scripts/SetAuthTargetGaia.ksh cc_na-$pool $env cc                                    212
        /share/DeploymentTools/scripts/DeployWrapperNoRecycleGaia.ksh cc_na-$pool $env cc stop                       214
        /share/DeploymentTools/cf-6.20/cf stop cc-20-user-generic-entitlements-rest-service
        /share/DeploymentTools/cf-6.20/cf stop cc-2.0-service
        /share/DeploymentTools/cf-6.20/cf stop cc-20-entitlements-rest-service
        /share/DeploymentTools/cf-6.20/cf stop cc-20-ui-service
        /share/DeploymentTools/cf-6.20/cf stop cc-utils-service
        /share/DeploymentTools/cf-6.20/cf stop cc-calc-service
        /share/DeploymentTools/cf-6.20/cf stop cc-verification-service
        sleep 60
        /share/DeploymentTools/cf-6.20/cf logout
    done
done for env in test
do
    for pool in 1a 1b 2b 3b
    do
        /share/DeploymentTools/scripts/SetAuthTargetGaia.ksh cc_na-$pool $env cc
        /share/DeploymentTools/scripts/DeployWrapperNoRecycleGaia.ksh cc_na-$pool $env cc stop
        /share/DeploymentTools/cf-6.20/cf stop cc-20-user-generic-entitlements-rest-service
        /share/DeploymentTools/cf-6.20/cf stop cc-2.0-service
        /share/DeploymentTools/cf-6.20/cf stop cc-20-ui-service
        sleep 60
        /share/DeploymentTools/cf-6.20/cf logout
    done
done
```

Figure 2

```
PROG_NAME-" 'basename $0' "
MY_DIRNAME-" 'dirname $0' "
USAGE-"
Usage:
'basename $0'  stop 4b dev
'basename $0'  start 4b dev
"
if [[ $# -lt 1 ]];then
    print "\n Invalid Number of Inputs -- Found Count#\"$#\" \n"
    print "$(USAGE)";exit 2 ;
fi Action-$1
CF_CMD-/share/█████████/DeploymentTools/cf-6.20/cf
DetailLogFile-/tmp/$PROG_NAME.log
AppNamesTemp-/tmp/AppNameTemp.txt
CurHostname-'hostname'
MailingList-█████████
CurDate-date echo > $DetailLogFile
echo > $AppNamesTemp $CF_CMD api | tee -a $(DetailLogFile)                                                310
CUR_ENV-'grep endpoint $(DetailLogFile) | uniq -c | cut -d " " -f 3-4'
$CF_CMD apps > $AppNamesTemp include app or string excluded from above output
appList-'awk "!/Getting/ && !/OK/ && !/urls/ && !/^$/' $AppNamesTemp  |awk '{print $1}''       312
for appName in $appList
    do
        $CF_CMD $Action $appName  | tee -a $(DetailLogFile)                          314
        sleep 1
done cat ${DetailLogFile} | mail -s " 'basename ${0}' :$(CUR_ENV):${pool}:$(Action):$(CurHostname):${CurDate}" "${MailingList}"    316
```

Figure 3

```
for env in dev                                                          410
do
    for pool in 1b 3b 1a 3a 4b
    do
        /share/[...]/DeploymentTools/scripts/SetAuthTargetGaia.ksh cc_na-$pool $env cc
        /share/[...]/DeploymentTools/scripts/GaiaOpsWrapper.ksh  stop
        sleep 60                                                              412
        /share/[...]/DeploymentTools/cf-6.20/cf logout
    done
done for env in test                                                         414
do
    for pool in 1a 1b 2b 3b
    do
        /share/[...]/DeploymentTools/scripts/SetAuthTargetGaia.ksh cc_na-$pool $env cc
        /share/[...]/DeploymentTools/scripts/GaiaOpsWrapper.ksh stop
        sleep 60
        /share/[...]/DeploymentTools/cf-6.20/cf logout
    done
done
```

Figure 4

| | | |
|---|---|---|
| 1... | GaiaOps Wrapper.ksh:test.na-3b::start: Thu Aug 2 12:10:03 BST 2018 | Thu 8/2/2018 12:11 PM |
| 2... | GaiaOps Wrapper.ksh:test.na-3b::start: Thu Aug 2 08:07:07 BST 2018 | Thu 8/2/2018 8:14 AM |
| 2... | GaiaOps Wrapper.ksh:dev.na-4b::start: Thu Aug 2 05:33:38 BST 2018 | Thu 8/2/2018 5:41 AM |
| 9... | GaiaOps Wrapper.ksh:dev.na-1b::start: Thu Aug 2 05:30:06 BST 2018 | Thu 8/2/2018 5:33 AM |
| 2... | GaiaOps Wrapper.ksh:test.na-1a::start: Thu Aug 2 05:00:12 BST 2018 | Thu 8/2/2018 5:07 AM |
| 1... | GaiaOps Wrapper.ksh:test.na-3b::stop: Thu Aug 2 00:13:15 BST 2018 | Thu 8/2/2018 12:14 AM |
| 1... | GaiaOps Wrapper.ksh:test.na-2b::stop: Thu Aug 2 00:11:31 BST 2018 | Thu 8/2/2018 12:12 AM |
| 1... | GaiaOps Wrapper.ksh:test.na-1b::stop: Thu Aug 2 00:09:46 BST 2018 | Thu 8/2/2018 12:11 AM |
| 1... | GaiaOps Wrapper.ksh:test.na-1a::stop: Thu Aug 2 00:07:59 BST 2018 | Thu 8/2/2018 12:09 AM |
| 1... | GaiaOps Wrapper.ksh:dev.na-4b::stop: Thu Aug 2 00:06:08 BST 2018 | Thu 8/2/2018 12:07 AM |
| 1... | GaiaOps Wrapper.ksh:dev.na-3a::stop: Thu Aug 2 00:05:00 BST 2018 | Thu 8/2/2018 12:05 AM |
| 1... | GaiaOps Wrapper.ksh:dev.na-1a::stop: Thu Aug 2 00:03:19 BST 2018 | Thu 8/2/2018 12:04 AM |
| 1... | GaiaOps Wrapper.ksh:dev.na-3b::stop: Thu Aug 2 00:01:41 BST 2018 | Thu 8/2/2018 12:02 AM |
| 8... | GaiaOps Wrapper.ksh:dev.na-1b::stop: Thu Aug 2 00:00:18 BST 2018 | Thu 8/2/2018 12:01 AM |

Figure 5

```
$ ls –ltr GaiaOpsWrapper.ksh |wc
     1      9     64
$ cat
$ ls  -ltr GaiaOpsWrapper.ksh
-rwxr-xr-x  1  ▇▇  ▇▇ 2068 Mar 29  2019  GaiaOpsWrapper.ksh
$ cat GaiaOpsWrapper.ksh |wc
    66    203   2068
                    ────── 610
$
```

SYSTEM AND METHOD FOR IMPLEMENTING CLOUD OPERATION WITH NO PRIOR KNOWLEDGE OF SERVICES

CROSS REFERENCE TO RELATED APPLICATIONS

The application claims priority to U.S. Provisional Application 62/984,846, filed Mar. 4, 2020, the contents of which are incorporated herein in their entirety.

FIELD OF THE INVENTION

The invention relates generally to a system and method for implementing cloud operation with no prior knowledge of services and no prior configuration.

BACKGROUND OF THE INVENTION

With fast growing cloud and micro-services technology, there is an increasing demand on operation automation on common daily tasks. With a single or limited services running on cloud services, a cloud operator can use a management console or individual command line interface (CLI) for operation task. However, when a large number of services (10+) are running in multiple pools (5+) at the same time, daily basic operations become a significant challenge, and oftentimes introduce human errors, inefficiencies as well as delays in agile changes in the software development life cycle.

These and other drawbacks exist.

SUMMARY OF THE INVENTION

According to one embodiment, the invention relates to a system that realizes cloud operation with substantially limited human dependencies and no prior knowledge of services including service addition and/or deletion. The system comprises: a memory component that stores cloud operation data; an interactive user interface that receives inputs via a communication network; a cloud endpoint interface that is communicatively coupled to one or more cloud endpoints; and a computer processor coupled to the memory component, the interactive user interface and the cloud endpoint interface, the computer processor further programmed to perform the steps of: enabling, via the cloud endpoint interface, a user to access a cloud endpoint; querying one or more existing services to be deployed in a cloud pool dynamically at runtime to generate query results; applying a smart query logic and filtering to the query results to dynamically generate an array of services to operate; based on the array of services, automatically executing cloud service operations based on an input parameter; generating a log notification for the cloud service operations; and communicating, via the communication network, the log notification to one or more recipients.

According to another embodiment, the invention relates to a method that realizes cloud operation with substantially limited human dependencies and no prior knowledge of services including service addition and/or deletion. The method comprises the steps of: enabling, via a cloud endpoint user interface, a user to access a cloud endpoint; querying, via a computer processor, one or more existing services to be deployed in a cloud pool dynamically at runtime to generate query results; applying a smart query logic and filtering to the query results to dynamically generate an array of services to operate; based on the array of services, automatically executing cloud service operations based on an input parameter; generating a log notification for the cloud service operations; and communicating, via a communication network, the log notification to one or more recipients.

An embodiment of the present invention may involve a specially programmed computer system comprising one or more computer processors, interactive interfaces, electronic storage devices, and networks. The computer implemented system and method described herein provide unique advantages to entities, users and other participants, according to various embodiments of the invention. An embodiment of the present invention achieves significant benefits and efficiencies through cloud operation with no prior knowledge of services and other service details. With an embodiment of the present invention, human interaction may be significantly reduced or even eliminated (with the limited exception of defining smart query logic) thereby minimizing human errors or other mistakes. An embodiment of the present invention further seeks to reduce security risk by fully automating, controlling and predefining operation actions. Accordingly, an embodiment of the present invention achieves significant savings in time and efforts related to human operations on constantly changing cloud service environments. Such operations may relate to adding, updating, modifying and/or deleting services, for example. In addition, an embodiment of the present invention efficiently integrates audit and monitoring abilities using logging, email notification and other communications.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

FIG. 2 is an exemplary user interface.

FIG. 3 is an exemplary interactive user interface, according to an embodiment of the present invention.

FIG. 4 is an exemplary interactive user interface, according to an embodiment of the present invention.

FIG. 5 is an exemplary interactive user interface, according to an embodiment of the present invention.

FIG. 6 is an exemplary interactive user interface, according to an embodiment of the present invention.

FIG. 7 is an exemplary interactive user interface, according to an embodiment of the present invention.

FIG. 8 is an exemplary interactive user interface, according to an embodiment of the present invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to significantly reducing or eliminating human dependencies as well as user input to operate cloud services easily and automatically, with zero knowledge of service addition or deletion at any time. The innovative automation invention is directed to managing common cloud operation actions, including "stop", "start", "restage" and "app" services deployed in cloud environments, cloud pools and other multi-cloud application platforms, e.g., Pivotal Cloud Foundry, etc.

An embodiment of the present invention is directed to realizing cloud operation automation with no prior knowledge of services and related details. Cloud technology supports agile software development. Using cloud technology involves constant changes of services, including addition, update, and deletion in the cloud environment. As a result, operation and management efforts are required to match constant changes for common operations, such as stop, start, re-deploy, and/or delete services. An embodiment of the present invention is directed to cloud automation that is environment agnostic and requires no prior knowledge of services and no service configuration. The innovative system provides a zero knowledge cloud service operation automation (with the limited exception of defining smart query logic).

Figure 7:
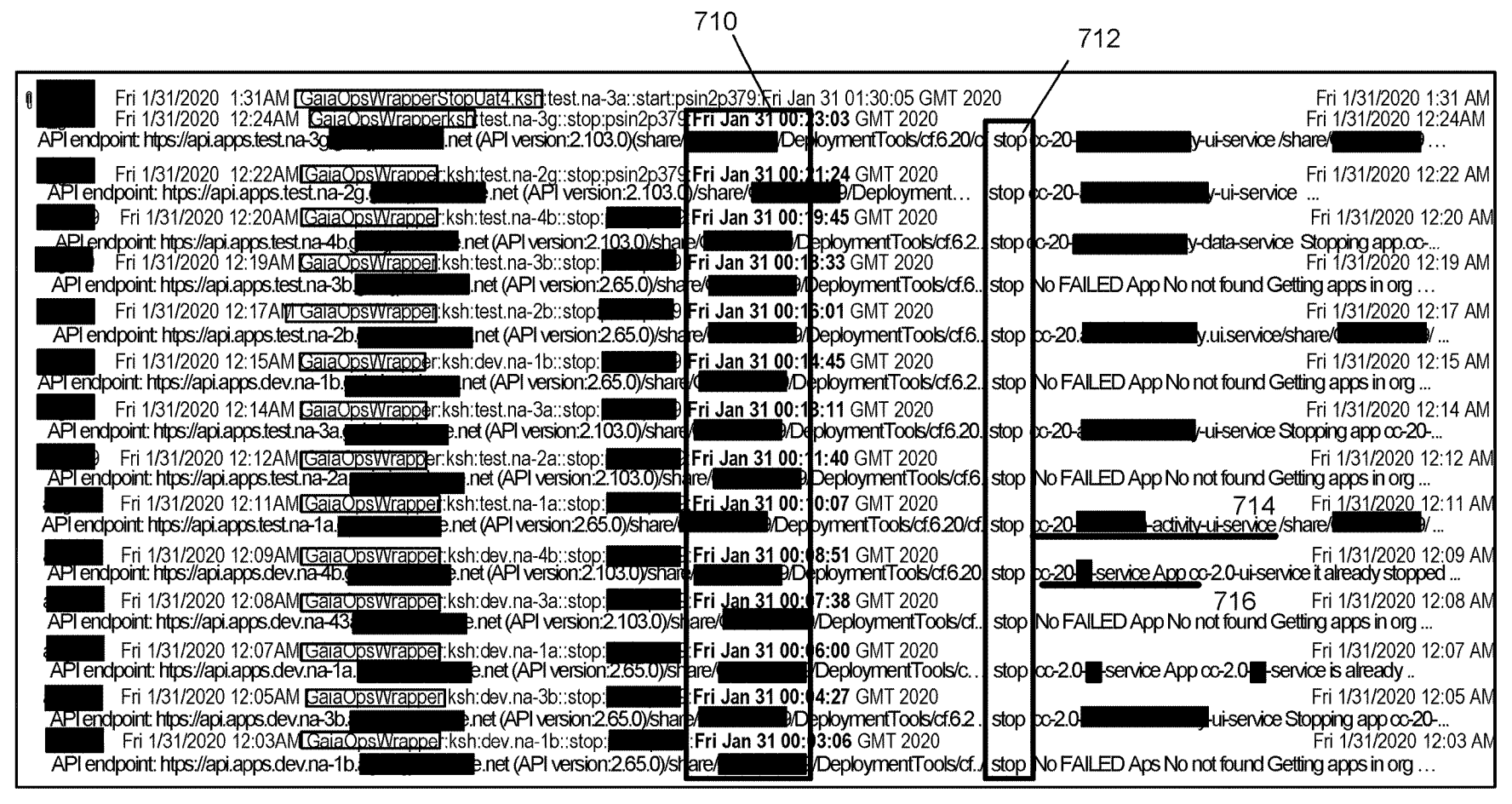
Figure 8:
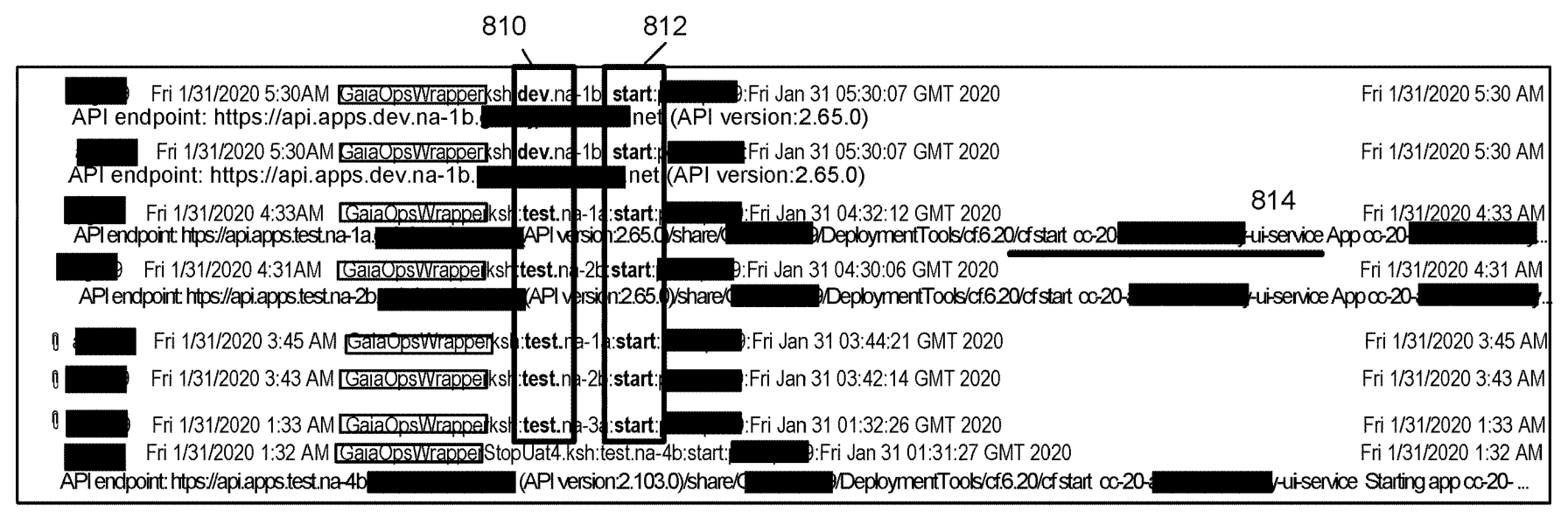

According to an exemplary scenario, an embodiment of the present invention may run based on a schedule (e.g., twice during weekdays, etc.) with stop services in multiple cloud pools for cost optimization at the end of the day, and start services at the beginning of the day when development teams start working (this is illustrated in FIGS. 7 and 8 below). Even though each development cloud pool may run a different number of services and change daily, an embodiment of the present invention may handle cloud services operation without service domain knowledge of the cloud pools. Furthermore, when this program is integrated with a scheduling job or Autosys platform, the daily cloud operation of "stop", "start" may be fully automated, with zero knowledge of cloud pool details and zero human efforts.

Figure 1:
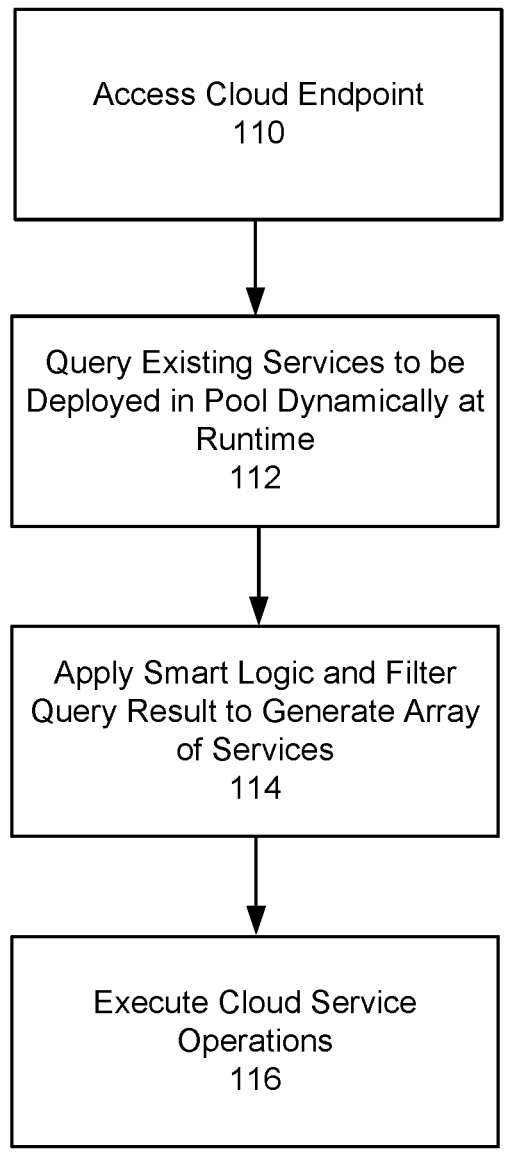
FIG. 1 is an exemplary process flow, according to an embodiment of the present invention.

FIG. 1 is an exemplary process flow, according to an embodiment of the present invention. At step 110, a user may login to or access a cloud endpoint. At step 112, an embodiment of the present invention may query existing services to be deployed in a cloud pool dynamically at runtime. At step 114, an embodiment of the present invention may apply a smart logic and filter query results to generate an array of services to operate. At step 116, the innovative system may then execute cloud service operations. While the process of FIG. 1 illustrates certain steps performed in a particular order, it should be understood that the embodiments of the present invention may be practiced by adding one or more steps to the processes, omitting steps within the processes and/or altering the order in which one or more steps are performed. The steps will be described in more detail below.

At step 110, a user may login to or access a cloud endpoint. Cloud endpoints may represent different regions, zones, availability zones, etc. Cloud endpoints may also represent a datacenter. Other cloud systems and applications may be applied.

At step 112, an embodiment of the present invention may query existing services to be deployed in a cloud pool dynamically at runtime. An embodiment of the present invention may dynamically extract environmental metadata at runtime. Without prior knowledge of services or any prior configuration, an embodiment of the present invention may dynamically query the cloud metadata to be used to identify and then execute actions. An embodiment of the present invention may be applied at scale. This may apply to a single service, multiple services as well as many services. The cloud pool may refer to an availability zone, data center and/or other defined region.

At step 114, an embodiment of the present invention may apply a smart logic and filter query results to generate an array of services to operate. For example, the smart logic may collect outputs, apply formatting and cleanse the data to generate an actionable format.

At step 116, the innovative system may then execute cloud service operations. For example, cloud service operations may be executed using an input parameter. According to another example, an embodiment of the present invention may be programmed to run based on a defined schedule. At a later point in time, an embodiment of the present invention may then update the endpoint to processing on another pool or availability zone. In this example, the update may be limited to identifying an availability zone, region and/or other endpoint.

An embodiment of the present invention recognizes that applications are being developed continuously and services may be added on a regular basis. An embodiment of the present invention facilitates this process with the smart logic and filtering features by dynamically generating an array of services. In addition, significant efficiencies in resources and time are realized by optimizing execution of services through the smart logic configuration.

FIG. 2 is an exemplary user interface. FIG. 2 illustrates a current cloud operation using linear configuration file or individual command line interface (CLI) to operate constantly changing micro-services deployed in the cloud. 210 represents cloud operation before zero knowledge automation. 212 illustrates a script using a configuration file with a predefined services list. 214 shows cloud operation utility usage in a daily stop job and stop services in five development pools (e.g., 1*b*, 3*b*, 1*a*, 3*a*, 4*b*) and four test pools (e.g., 1*a*, 1*b*, 2*b*, 3*b*). As shown by 212 and 214, there are 7 release units or micro services running on a particular cloud environment. With the conventional system shown in FIG. 2, each release unit would need to be executed individually and sequentially in a manual manner.

FIG. 3 is an exemplary interactive user interface, according to an embodiment of the present invention. FIG. 3 shows an automatic cloud service operation using smart query logic and filtering to dynamically generate service items at runtime (as shown by 310, 312, 314). Smart query logic may be applied to generate a service list. In this example, 310 illustrates an output represented as raw data. As shown in FIG. 3, 312 represents a smart query logic that generates a dynamic array. The dynamic array may be based on the endpoint (e.g., pool, availability zone, etc.) in a particular environment. In addition, the dynamic array may be generated based on the output represented by 310. Because the process is dynamic, when new services are added or modified, no additional updates or steps are needed. The smart query logic may be applied to a single service as well as multiple services and captures new services as they are added and/or modified. Step 314 applies an action. The action may represent a command (shown as CF_CMD) and may include stop, start, restart, check, etc. An embodiment of the present invention may traverse the dynamic array and grab an item and apply an appropriate action as defined or determined. For example, a stop action may involve shutting down micro services in a pool at a predetermined time in the evening. A start action may involve starting micro services in a pool at a particular time in the morning. Other actions may be designated for the weekends, holidays and may be further defined for other events, conditions, etc. For example, in response to an event, hardware and software may be set to restart to address an environment change.

Step 316 represents sending a log notification in an email or other communication. The log notification may include monitoring information, status data, etc. In addition, alerts may be generated to report issues and other events.

FIG. 4 is an exemplary interactive user interface, according to an embodiment of the present invention. FIG. 4 illustrates an improved cloud operation process after automation, where hard-coded individual services are eliminated as compared to FIG. 2.

According to an exemplary illustration, FIG. 4 is an implementation of the workflow illustrated in FIG. 3. 410 identifies five development (DEV) pools (e.g., 1b, 3b, 1a, 3a, 4b). At 412, an operation action is applied. In this example, the operation action represents an end of day maintenance action. As shown in FIG. 4, 412 represents a cloud operation utility usage in a daily stop job. In this example, an embodiment of the present invention applies stop services in five development pools and four test pools with zero knowledge of service name or other details. As shown in FIG. 4, the same (or similar) operation action may be applied to a different environment, now test pools, as represented by 414 (e.g., 1a, 1b, 2b, 3b). FIG. 4 illustrates that operation actions may be applied to different environments (e.g., development, test, QA (qualify assurance), UAT (user acceptance testing), etc.) in an efficient and simple manner. This further supports the elasticity and scalability of the various embodiments of the present invention that may be achieved by simply updating the endpoints. This is particular useful when an environment has resource constraints and other efficiency restrictions.

FIG. 5 is an exemplary interactive user interface, according to an embodiment of the present invention. FIG. 5 illustrates an exemplary log of event records. In this example, the log event details are shown sequentially with start events and then stop events. Other filters and preferences may be applied. As shown in FIG. 5, cloud operation automation is audit compliant with friendly monitoring and email notification ability. When integrated with a scheduling job application or system, full automation may be achieved with zero human intervention and zero knowledge of services deployed in cloud. According to an embodiment of the present invention, cloud operation utility may track various actions and then send notifications (or other communications) at execution time, for example.

FIG. 6 is an exemplary interactive user interface, according to an embodiment of the present invention. FIG. 6 illustrates an operation automation program and further highlights the simplicity of the innovative system, e.g., 66 lines of code, as shown by 610.

FIG. 7 is an exemplary interactive user interface, according to an embodiment of the present invention. FIG. 7 is an exemplary illustration of log events and further details actions relating to a specific pool (e.g., 3a). According to an exemplary illustration, an operation automation program may run periodically (e.g., daily during week days), connect multiple cloud pools (e.g., multiple environments), stop (e.g. operation action) various running services, and send a notification (e.g., email). An embodiment of the present invention may operate without human intervention, except for the initial setup of the program and a smart query filter. As shown by 710, automation program may be integrated with a scheduling job. Other integrations with other systems, applications and services may be supported. As shown by 712, cloud operation may "stop" various services in multiple pools (e.g., 14 pools). The "stop" identified by 712 may relate to UI services, data services, etc. Other operations may be applied. As shown by 714 and 716, different services may run in different pools. Accordingly, an embodiment of the present invention may execute different services in different pools without prior knowledge of services running inside any of the pools.

FIG. 8 is an exemplary interactive user interface, according to an embodiment of the present invention. FIG. 8 illustrates an operation automation program based on a schedule. In this example, the operation automation program runs at the beginning of weekdays to perform cloud operation ("start") services following pre-defined schedules, with zero knowledge of development changes in the cloud. As shown by 810, cloud operations may run on different pools, such as development (dev), test, etc. 812 may represent cloud operation of "start" services. At 814, operation "start" action applies to services queried. This may include UI services.

Figure 9:
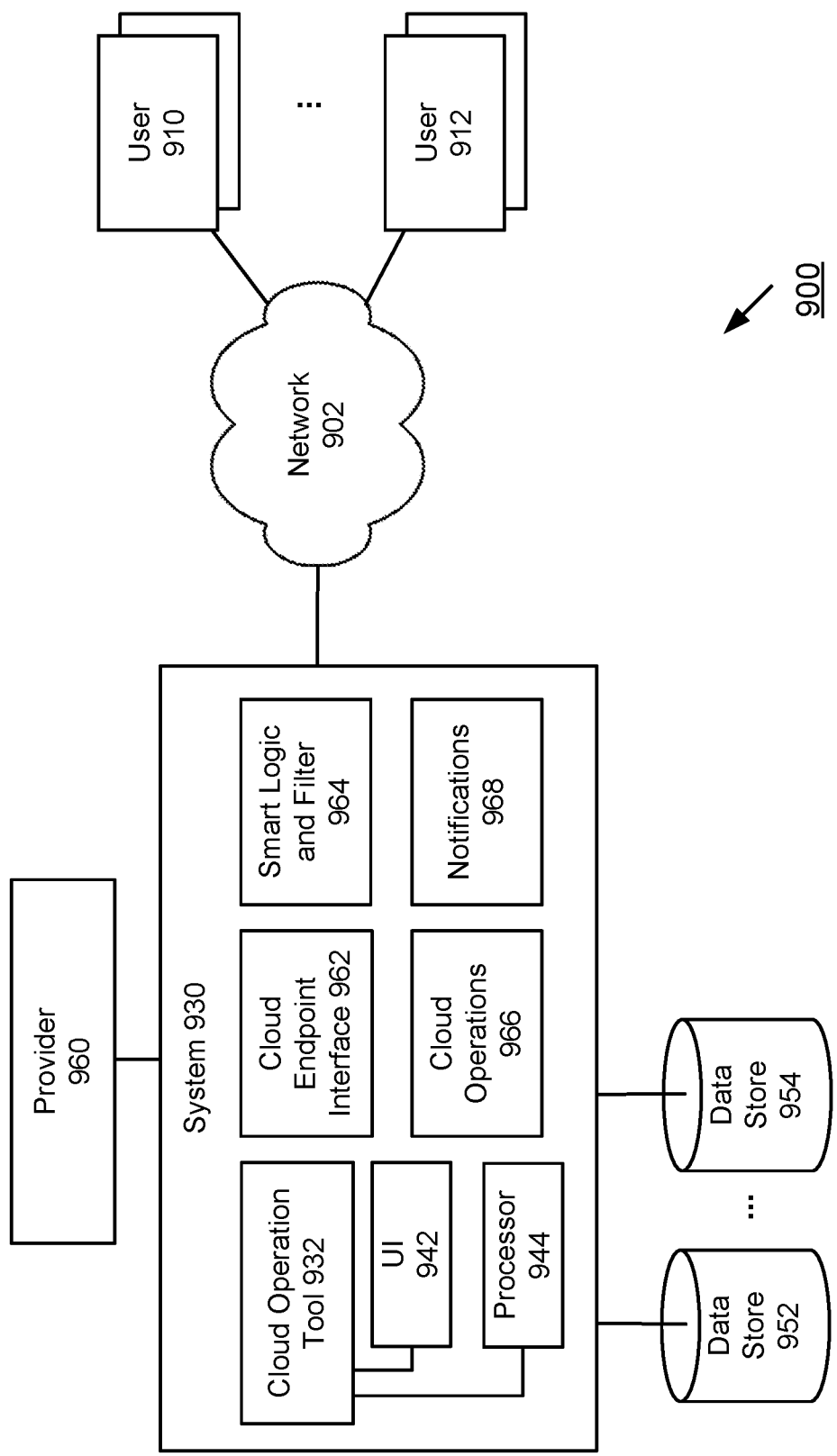
FIG. 9 is an exemplary system diagram, according to an embodiment of the present invention.

FIG. 9 is an exemplary system diagram, according to an embodiment of the present invention. Users 910, 912 may interact with an embodiment of the present invention provided by System 930 through Network 902. As illustrated in FIG. 9, Users 910, 912 may use various computing devices, such as computers, laptops, workstations, kiosks, terminals, tablets, mobile devices, mobile phones, smart devices, or other computing devices capable of sending or receiving processing signals. For example, computing devices may have an application installed that is associated with an Entity that operates System 930. System 930 may be integrated with various systems and applications that support SDLC processes. As shown in FIG. 9, System 930 may include a Cloud Operation Tool 932 that provides cloud operation with zero knowledge automation in software development life cycle. While FIG. 9 illustrates individual devices or components, it should be appreciated that there may be several of such devices to carry out the various exemplary embodiments.

Cloud Operation Tool 932 may incorporate modules and other functions, such as User Interface (UI) 942 and Processor 944. Other modules may include Cloud Endpoint Interface 962, Smart Logic and Filter 964, Cloud Operations 966 and Notifications 968. These modules are exemplary and illustrative, Cloud Operation Tool 932 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System 930 may be communicatively coupled to data storage devices represented by Data stores 952, 954. Also, Data stores 952, 954 may also store and maintain cloud operation data, query results, source code, reports, performance data, notifications, analytics, etc. The cloud operation with zero knowledge automation features described herein may be provided by an Entity and/or a third party provider, represented by 960, where Provider 960 may operate with System 930 and/or an Entity.

The system 900 of FIG. 9 may be implemented in a variety of ways. Architecture within system 900 may be implemented as hardware components (e.g., module) within one or more network elements. It should also be appreciated that architecture within system 900 may be implemented in computer executable software (e.g., on a tangible, non-transitory computer-readable medium) located within one or more network elements. Module functionality of architecture within system 900 may be located on a single device or distributed across a plurality of devices including one or more centralized servers and one or more mobile units or end user devices. The architecture depicted in system 900 is meant to be exemplary and non-limiting. For example, while connections and relationships between the elements of system 900 is depicted, it should be appreciated that other connections and relationships are possible. The system 900 described below may be used to implement the various methods herein, by way of example. Various elements of the system 900 may be referenced in explaining the exemplary methods described herein.

Network 902 may be a wireless network, a wired network or any combination of wireless network and wired network. For example, Network 902 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 902 may support an Internet network, a wireless communication network, a cellular network, Bluetooth, or the like, or any combination thereof. Network 902 may further include one, or any number of the exemplary types of networks mentioned above operating as a stand-alone network or in cooperation with each other. Network 902 may utilize one or more protocols of one or more network elements to which it is communicatively coupled. Network 902 may translate to or from other protocols to one or more protocols of network devices. Although Network 902 is depicted as one network for simplicity, it should be appreciated that according to one or more embodiments, Network 202 may comprise a plurality of interconnected networks, such as, for example, a service provider network, the Internet, a cellular network, corporate networks, or even home networks, or any of the types of networks mentioned above.

Data may be transmitted and received via Network 902 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

System 930 may be communicatively coupled to Data Stores 952, 954 as well as remote storages. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 902, or communications may involve a direct connection between the various storage components and System 930, as depicted in FIG. 9. The storage components may also represent cloud or other network based storage.

Figure 10:
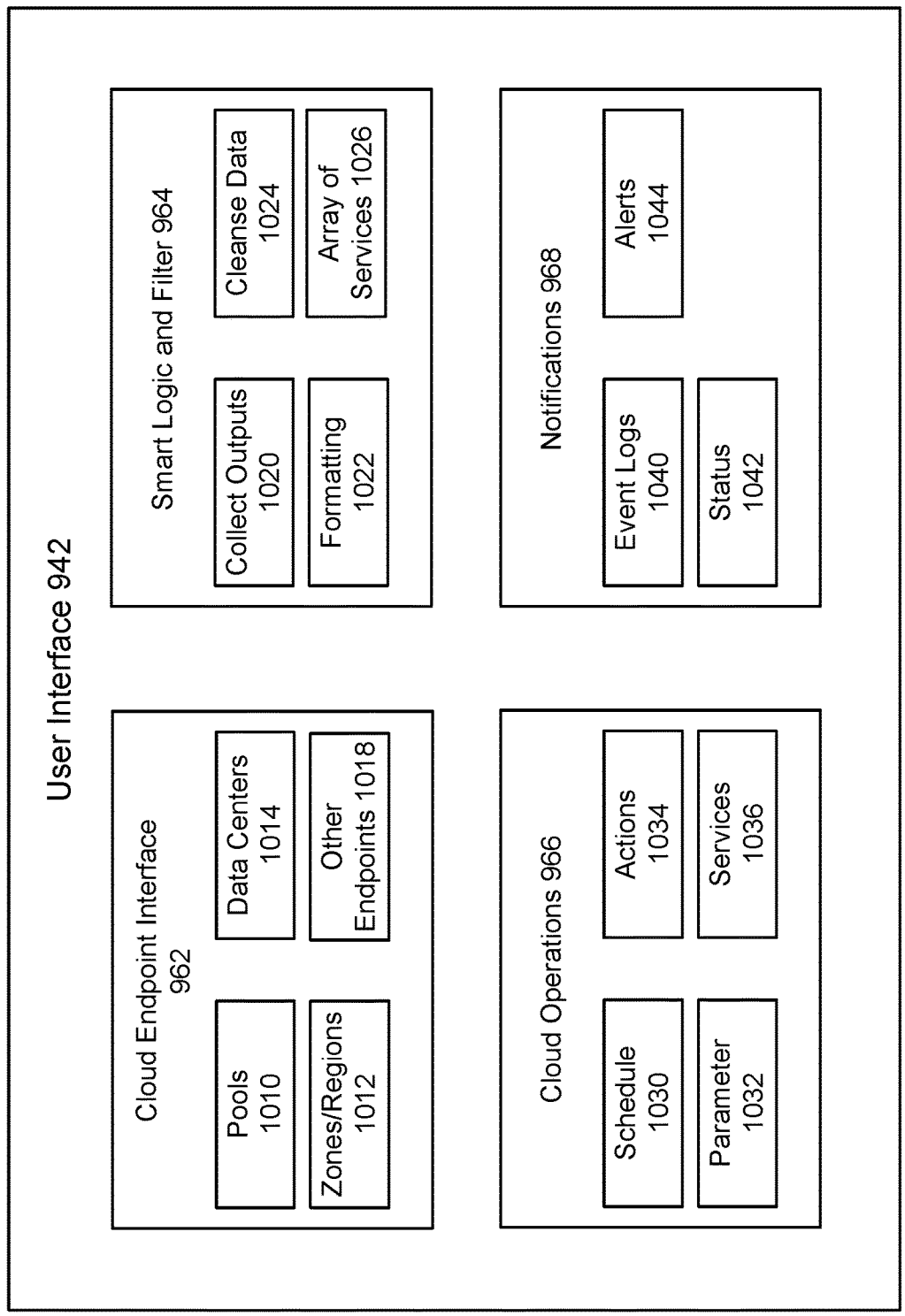
FIG. 10 is an exemplary interactive user interface, according to an embodiment of the present invention.

FIG. 10 is an exemplary interactive user interface, according to an embodiment of the present invention. As shown in FIG. 10, User Interface 942 may include various modules including Cloud Endpoint Interface 962, Smart Logic and Filter 964, Cloud Operations 966 and Notifications 968. User Interface 942 may provide various views and displays.

Cloud Endpoint Interface 962 may specify and identify Pools 1010, Zones/Regions 1012, Data Centers 1014 and other endpoints represented by 1018.

Smart Logic and Filter 964 may collect outputs 1012, apply formatting 1022 and cleanse data 1024. This may then be used to dynamically generate an Array of Services 1026.

Cloud Operations 966 may include Schedule 1030, Parameter 1032, Actions 1034 and Services 1036. Cloud operations may be performed in accordance with a schedule which may be defined by Schedule 1030. Cloud operations may be based on an input parameter, identified by 1032. Various actions represented by 1034 and services detailed by 1036 may be performed.

Notifications 968 may include Event Logs 1040, Status 1042 and Alerts 1044.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, PHP, C#, Go, Swift, Rust, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements cloud operation with substantially limited human dependencies and no prior knowledge of services, the system comprising:
   a memory component that stores cloud operation data;
   an interactive user interface that receives inputs via a communication network;
   a cloud endpoint interface that is communicatively coupled to one or more cloud endpoints; and
   a computer processor coupled to the memory component, the interactive user interface and the cloud endpoint interface, the computer processor further programmed to perform the steps of:
      enabling, via the cloud endpoint interface, a user to access a cloud endpoint in a cloud pool, wherein the cloud endpoint represents a particular datacenter;
      without prior knowledge of services or any prior configuration, dynamically querying cloud metadata, at runtime, for identifying one or more existing services to be deployed in the cloud pool to generate query results;

applying a smart query logic and filtering to the query results to dynamically generate an array of services to operate, wherein the array of services are generated based on the cloud endpoint accessed;

based on the array of services, automatically executing cloud service operations based on an input of the cloud endpoint, wherein each of the cloud service operations automatically executed identify a micro service operation being executed, a corresponding cloud pool, and a timeframe for execution, wherein at least two cloud service operations are being executed contemporaneously in different cloud pools, and wherein the automatically executed cloud service operations include each of a stop, start, re-deploy and delete service operation;

updating the cloud endpoint to perform processing on another cloud end point included in another cloud pool;

generating a log notification for the cloud service operations; and communicating, via the communication network, the log notification to one or more recipients.

2. The system of claim 1, wherein the cloud pool represents one or more of: a development pool and a test pool.

3. The system of claim 1, wherein the cloud service operations execute on multiple cloud pools.

4. The system of claim 1, wherein the smart query logic is programmed to collect outputs from the one or more existing services and apply formatting to the collected outputs.

5. The system of claim 1, wherein querying one or more existing services comprises dynamically extracting, at runtime, metadata of an environment in which the cloud endpoint resides.

6. The system of claim 1, wherein the smart query logic is preconfigured.

7. The system of claim 1, wherein the cloud operation comprises a stop action that shuts down a set of micro services in the pool at a predetermined time.

8. The system of claim 1, wherein the cloud operation comprises a start action that starts a set of micro services in the pool at a predetermined time.

9. A method that implements cloud operation with substantially limited human dependencies and no prior knowledge of services, the method comprising the steps of:

enabling, via a cloud endpoint interface, a user to access a cloud endpoint in a cloud pool, wherein the cloud endpoint represents a particular datacenter;

without prior knowledge of services or any prior configuration, dynamically querying cloud metadata, at run time and via a computer processor, for identifying one or more existing services to be deployed in the cloud pool to generate query results;

applying a smart query logic and filtering to the query results to dynamically generate an array of services to operate, wherein the array of services are generated based on the cloud endpoint accessed;

based on the array of services, automatically executing cloud service operations based on an input of the cloud endpoint, wherein each of the cloud service operations automatically executed identify a micro service operation being executed, a corresponding cloud pool, and a timeframe for execution, wherein at least two cloud service operations are being executed contemporaneously in different cloud pools, and wherein the automatically executed cloud service operations include each of a stop, start, re-deploy and delete service operation;

updating the cloud endpoint to perform processing on another cloud end point included in another cloud pool;

generating a log notification for the cloud service operations; and communicating, via a communication network, the log notification to one or more recipients.

10. The method of claim 9, wherein the cloud pool represents one or more of: a development pool and a test pool.

11. The method of claim 9, wherein the cloud service operations execute on multiple cloud pools.

12. The method of claim 9, wherein the smart query logic is programmed to collect outputs from the one or more existing services and apply formatting to the collected outputs.

13. The method of claim 9, wherein querying one or more existing services comprises dynamically extracting, at runtime, metadata of an environment in which the cloud endpoint resides.

14. The method of claim 9, wherein the smart query logic is preconfigured.

15. The method of claim 9, wherein the cloud operation comprises a stop action that shuts down a set of micro services in the pool at a predetermined time.

16. The method of claim 9, wherein the cloud operation comprises a start action that starts a set of micro services in the pool at a predetermined time.

* * * * *